United States Patent
Roger et al.

(10) Patent No.: US 10,437,989 B2
(45) Date of Patent: Oct. 8, 2019

(54) SECURE SIGNAL TRANSMISSION

(71) Applicant: Infineon Technologies AG, Neubiberg (DE)

(72) Inventors: Andre Roger, Munich (DE); Romain Ygnace, Munich (DE)

(73) Assignee: Infineon Technologies AG, Neubiberg (DE)

( * ) Notice: Subject to any disclaimer, the term of this patent is extended or adjusted under 35 U.S.C. 154(b) by 90 days.

(21) Appl. No.: 15/252,503

(22) Filed: Aug. 31, 2016

(65) Prior Publication Data
US 2018/0060573 A1 Mar. 1, 2018

(51) Int. Cl.
*G06F 21/55* (2013.01)
*G06F 21/85* (2013.01)

(52) U.S. Cl.
CPC .......... *G06F 21/552* (2013.01); *G06F 21/85* (2013.01); *G06F 2221/034* (2013.01)

(58) Field of Classification Search
CPC ................................ G06F 21/52; G06F 21/552
See application file for complete search history.

(56) References Cited

U.S. PATENT DOCUMENTS

2013/0266308 A1* 10/2013 Fukuchi ............... H04B 10/616
398/16
2014/0114489 A1* 4/2014 Duff ....................... G06Q 50/06
700/291

\* cited by examiner

*Primary Examiner* — Dao Q Ho
(74) *Attorney, Agent, or Firm* — Schiff Hardin LLP

(57) ABSTRACT

A processing device having a skew controller configured to measure skew values between a plurality of signal lines coupled to the processing device; and a security module configured to store the skew values, and to compare new skew values with the stored skew values, wherein when the new skew values do not equal the stored skew values, the processing device is configured to perform an alarm action.

21 Claims, 2 Drawing Sheets

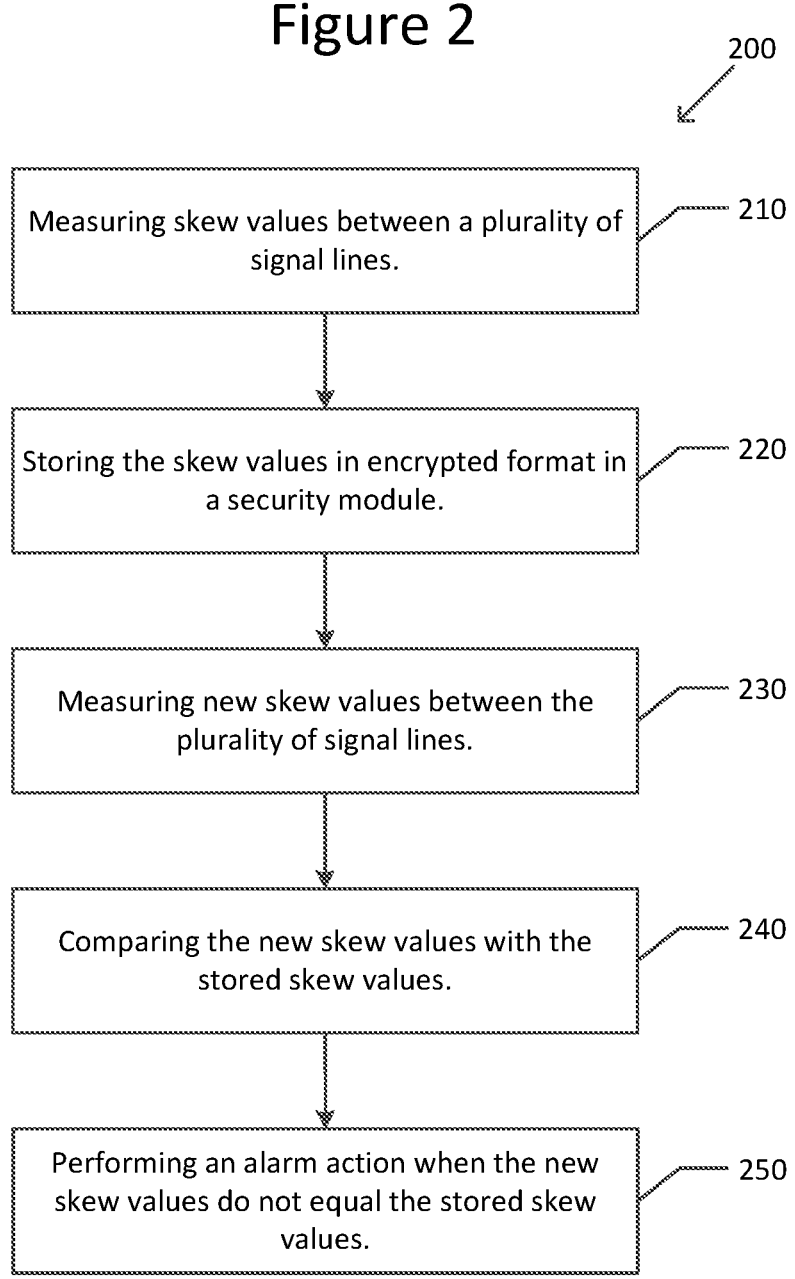

SECURE SIGNAL TRANSMISSION

BACKGROUND

Advanced Driver Assistance Systems (ADAS) and autonomous driving systems allow an automobile to drive itself. These systems must be secured against external attacks by hackers attempting to change the automobile's behavior.

The ADAS system has two main devices—a sensor device and a processing device. The sensor device may be, for example, a camera or radar system, and generates the sensor data. The processing device processes the sensor data to make driving decisions, such as braking.

Low Voltage Differential Signaling (LVDS) interfaces couple the sensor device and the processing device via signal lines. The LVDS interfaces and signal lines transmit a sensor data signal from the sensor device to the processing device. This sensor data signal could become a hacker target. Hacking may be active, that is, the hacker may modify the signal lines to replace an original sensor data signal with a fake sensor data signal, or replace the sensor device. Alternatively, the hacking may be passive, that is, the hacker may use a measurement tool to listen to the transmitted sensor data signal.

Conventionally the sensor data signal is protected using encryption/hashing. To obtain a high level of integrity, the encryption hardware needs to support encryption streams of over 400 bits/s per channel. Up to eight channels are currently available, but twelve channels are foreseen. Support for such high bit rates requires expensive hardware.

BRIEF DESCRIPTION OF THE DRAWINGS

FIG. 2 illustrates a flow chart of a security method in accordance with an aspect of the disclosure.

DETAILED DESCRIPTION

Figure 1:
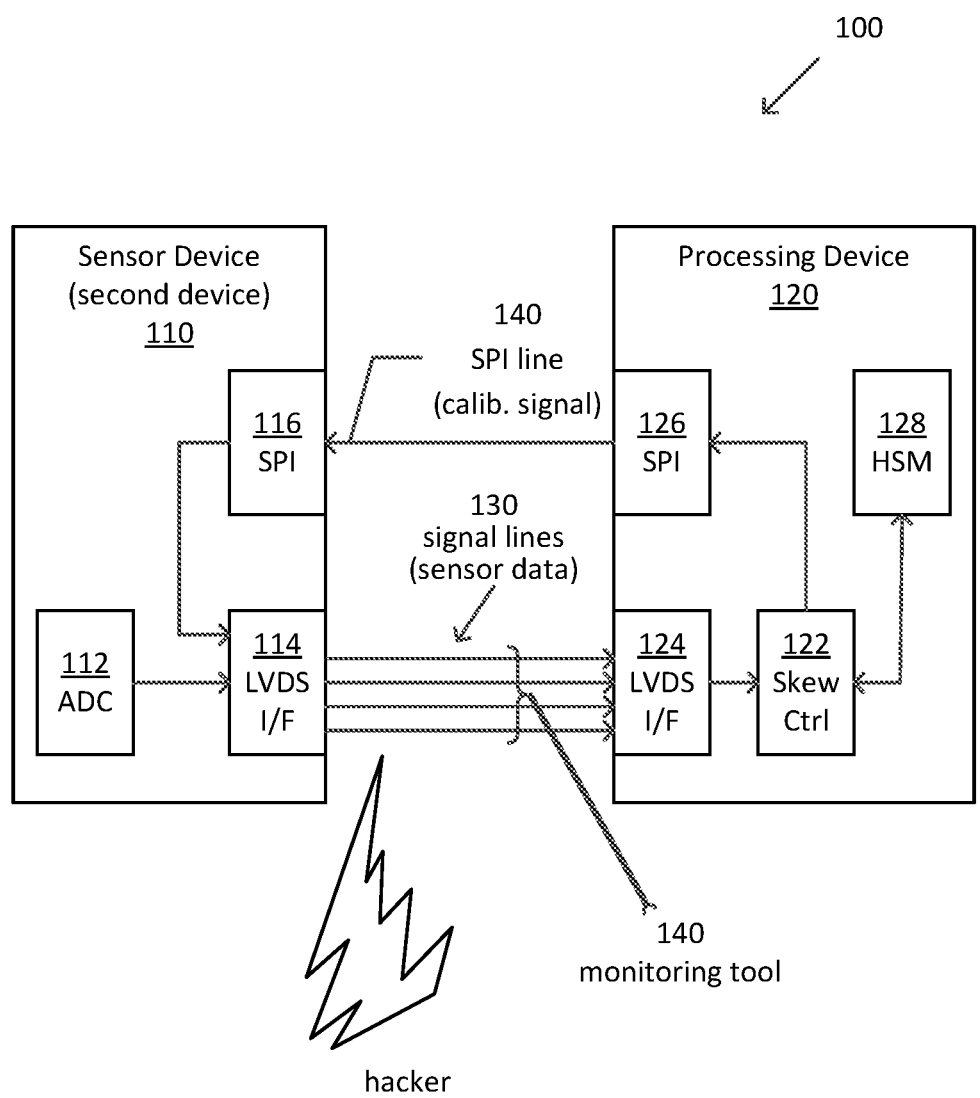
FIG. 1 illustrates a schematic diagram of a circuit in accordance with an aspect of the disclosure.

The present disclosure is directed to detecting an attack on a data signal transmitted to a processing device by a second device over signal lines of a circuit. During production of the Electronic Control Unit (ECU, skew values of the signal lines are stored in a security module of the processing device. Skew is a transmission time difference between signals transmitted over different signal lines. At startup, the circuit determines whether startup skew values are the same as those stored in the security module. Any change in the skew values indicates that physical properties of the circuit have been modified, and in response, the processing device performs an alarm action.

FIG. 1 illustrates a schematic diagram of a circuit 100 in accordance with an aspect of the disclosure.

The circuit 100 comprises a sensor device (second device) 110 and a processing device 120, which are coupled together via a plurality of signal lines 130 and via a Serial Parallel Interface (SPI) line 140. Although the disclosure describes the second device 110 as being a sensor device, the disclosure is not limited thereto; the second device 110 may be any device as suitable for the intended purpose.

The sensor device 110 comprises an analog-to-digital converter (ADC) 112, a Low Voltage Differential Signaling (LVDS) interface 114, and an SPI interface 116. The sensor device 110 is configured to sense data, and to send a corresponding sensor data signal to the processing device 120.

The ADC 112 is configured to convert the sensor data signal from analog to digital format.

The LVDS interface 114 is configured to transmit via the plurality of signal lines 130 a digital signal to a corresponding LVDS interface 124 of the processing device 120. The signal may be a calibration signal or the sensor data signal. The LVDS interface 114 may be configured in accordance with IEEE 1596.3. While the interface 112 is described as being an LVDS interface, the disclosure is not limited thereto. The interface may be any interface as suitable for the intended purpose. Further, the digital data may alternatively be transmitted in analog format.

Although the disclosure describes only one processing device 120 (first device) and one sensor device (second device) 110, the disclosure is not limited in this respect. There may be any number of processing devices 120 as suitable for the intended purpose. Also, each processing device 120 may be coupled to any number of sensor devices (second devices) 110 as suitable for the intended purpose.

The processing device 120 comprises a skew controller 122, an LVDS interface 124, an SPI 126, and a security module 128.

The skew controller 122 is configured to measure skew values between the plurality of signal lines 130. More specifically, the skew controller 122 takes one signal line as a reference signal line, and then measures a difference in signal transmission times between on another signal line as compared with the reference signal line. The skew values are measured during manufacture of the circuit 100 and stored, and then new skew values are measured at or subsequent to startup of the circuit 100. The new skew values could be measured at every startup. Further, the skew controller 122 may during operation compensate for signal skew based on these skew values.

The SPI 126 comprised within the processing device 120 is configured to transmit via the SPI line 140 a calibration signal to the SPI 116 comprised within the sensor device 110. The calibration signal is used for measuring the skew values.

The LVDS interface 124 is configured to receive via the plurality of signal lines 124 a reference signal, which is used to measure the skew values. During runtime, the LVDS interface 124 is configured to receive the sensor data signal.

The signal lines 130 coupled between the LVDS interface 114 and the LVDS interface 124 should each be a same signal length. For example, if there are four signal lines 130, signals should leave the LVDS 113 of the sensor device 110 at the same time, and more importantly, arrive at the LVDS 124 of the processing device 120 at the same time so that the signals are not out of synch. To avoid signal mismatch, the signal lines 130 should have a same length. However, exact length is not possible, so the skew controller 122 may compensate artificially for skews within the signal lines 130. During ECU manufacture in a secure production facility, the skew controller 122 measures skew values, and the security module 128 stores the skew values in encrypted format. The skew controller 122 uses the stored skew values to compensate for signal skews. This compensation is specific to the particular circuit 100, which may be a Printed Circuit Board (PCB).

The security module 128 is a Hardware Secure Module (HSM) configured to store the skew values, which are measured during manufacture, in encrypted format so as to be securely protected against external attacks. The security module 128 is also configured to compare the new skew values with the stored skew values. When the new skew values do not equal the stored skew values, physical properties of the circuit 100 may have been modified by a hacker. The hacker may have attempted to replace the sensor device 110, or to transmit to the processing device 120 fake sensor data. In response, the processing device 120 is configured to perform an alarm action. An alarm action may be, for example, for the processing device 110 shutting down and/or an error message.

A monitoring tool 140 configured to monitor signals transmitted through the signal lines 130 may be used in the field during validation of the ECU. Upon detection of such a monitoring tool 140, and with the support of the security module 128, the skew controller 122 may define different skew values between the plurality of signal lines 130, and store these different skew values in the security module 128. In one embodiment, the monitoring tool 140 may be configured to establish a secure communication with the security module 128, which authenticates the monitoring tool connection.

FIG. 2 illustrates a flow chart of a security method 200 of the circuit 100 comprising the processing device 120 coupled to the sensor device 110 via the plurality of signal lines 130 in accordance with an aspect of the disclosure.

In Step 210, the skew controller 122 measures skew values between the plurality of signal lines 130. This measuring step 210 may be performed during manufacture of the circuit 100, and may be initiated by transmitting a calibration signal from the processing device 120 to the sensor device 110. This measuring of the skew values may comprise measuring a difference in signal transmission times between two signal lines.

In Step 220, the skew values are stored in encrypted format in the security module 128. This storing step 220 may be performed during manufacture of the circuit 100.

In Step 230, the skew controller 122 measures new skew values between the plurality of signal lines 130. This measuring step 230 may be performed during or subsequent to a startup procedure of the circuit 100, and may be initiated by transmitting a calibration signal from the processing device 120 to the sensor device 110.

In Step 240, the security module 128 compares the new skew values with the stored skew values.

In Step 250, when the new skew values do not equal the stored skew values, an alarm action is performed. The action may be, for example, the processing device 120 ceasing to function, generating an error message, and/or taking any other appropriate action.

The circuit 100 and method 200 as disclosed here are advantageous in that protection does not rely on brute force encryption. Instead, protection relies on detecting when signal lines have new characteristics. No expensive encryption hardware is required. Also, this solution is applicable to any kind of high speed sensor interface.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A processing device, comprising:
   a skew controller configured to measure skew values between a plurality of signal lines coupled to the processing device; and
   a Hardware Secure Module (HSM) configured to store the skew values,
   wherein the skew controller is further configured to measure new skew values between the plurality of signal lines at or subsequent to startup of the circuit, compare the new skew values with the stored skew values, and compensate for skew between the plurality of signal lines based on the stored skew values to reduce a transmission time difference between signals transmitted over the plurality of signal lines.

2. The processing device of claim 1, further comprising:
   a Serial Parallel Interface (SPI) configured to transmit a calibration signal.

3. The processing device of claim 1, further comprising:
   a Low Voltage Differential Signaling (LVDS) interface configured to receive via the plurality of signal lines a reference signal, which is used to measure the skew values.

4. A circuit, comprising:
   the processing device as claimed in claim 1; and
   a second device coupled to the processing device by the plurality of signal lines, and configured to transmit a data signal to the processing device.

5. The circuit of claim 4, wherein the skew controller is further configured to measure the stored skew values during manufacture of the circuit.

6. The circuit of claim 4, wherein the second device is a sensor device configured to transmit a sensor data signal to the processing device.

7. The circuit of claim 4, wherein the second device comprises:
   an analog-to-digital converter configured to convert the data signal from analog to digital format.

8. The circuit of claim 4, wherein the second device further comprises:
   a Low Voltage Differential Signaling (LVDS) interface configured to transmit the data signal to a corresponding LVDS interface of the processing device via the plurality of signal lines.

9. The circuit of claim 4, further comprising:
   a plurality of second devices.

10. The circuit of claim 4, further comprising:
    a Serial Parallel Interface (SPI) comprised within the processing device and configured to transmit a calibration signal to an SPI comprised within the second device, wherein the calibration signal is used for measuring the stored skew values and the new skew values.

11. A security method of a circuit comprising a processing device coupled to a second device via a plurality of signal lines, the method comprising:
    first measuring, by a skew controller comprised within the processing device, skew values between the plurality of signal lines;
    storing the skew values in a Hardware Secure Module (HSM) comprised within the processing device;
    second measuring, by the skew controller, new skew values between the plurality of signal lines at or subsequent to startup of the circuit;
    comparing, the new skew values with the stored skew values; and compensating for skew between the plurality of signal lines based on the stored skew values to reduce a transmission time difference between signals transmitted over the plurality of signal.

12. The security method of claim 11, further comprising: performing an alarm action when the new skew values do not equal the stored skew values.

13. The security method of claim 11, wherein the first measuring and the storing are performed during manufacture of the circuit.

14. The security method of claim 11, further comprising:
   detecting a monitoring tool configured to monitor signals transmitted though the signal lines;
   defining, by the skew controller, different skew values between the plurality of signal lines based on the monitored signals; and
   storing, in the security module, the different skew values.

15. The security method of claim 11, wherein the measuring of the stored skew values or new skew values comprises:
   measuring a transmission time difference between signals transmitted over different signal lines of the plurality of signal lines.

16. A processing device, comprising:
   an interface configured to receive, over different signal lines of a plurality of signal lines from a second device, a reference signal and another signal;
   a skew controller configured to measure a skew value between the reference signal and the other signal, wherein the skew value is a transmission time difference; and
   a Hardware Secure Module (HSM) configured to store the skew value,
   wherein the skew controller is further configured to measure a new skew value between the plurality of signal lines at or subsequent to startup of a circuit comprising the processing device, compare the new skew value with the stored skew value,
   and compensate for skew between the plurality of signal lines based on the stored skew value to reduce a transmission time difference between signals transmitted over the plurality of signal lines.

17. The processing device of claim 16, further comprising:
   a Serial Parallel Interface (SPI) configured to transmit a calibration signal.

18. The processing device of claim 16, wherein the interface is a Low Voltage Differential Signaling (LVDS) interface.

19. The processing device of claim 16, wherein the skew controller is further configured to measure the stored skew value during manufacture of a circuit comprising the processing device.

20. The processing device of claim 16, wherein the other signal is a sensor data signal.

21. The processing device of claim 16, further comprising:
   a Serial Parallel Interface (SPI) configured to transmit a calibration signal to an SPI comprised within the second device, wherein the calibration signal is used for measuring the stored skew value and the new skew value.

* * * * *